United States Patent [19]

Reik

[11] Patent Number: 4,783,895

[45] Date of Patent: Nov. 15, 1988

[54] METHOD OF MAKING APPARATUS FOR DAMPING TORSIONAL VIBRATIONS

[75] Inventor: Wolfgang Reik, Bühl, Fed. Rep. of Germany

[73] Assignee: Luk Lamellen und Kupplungsbau GmbH, Bühl, Fed. Rep. of Germany

[21] Appl. No.: 66,075

[22] Filed: Jun. 23, 1987

[30] Foreign Application Priority Data

| Jul. 5, 1986 | [DE] | Fed. Rep. of Germany | 3622697 |
| Sep. 6, 1986 | [DE] | Fed. Rep. of Germany | 8623931 |
| Sep. 19, 1986 | [DE] | Fed. Rep. of Germany | 3631986 |
| Dec. 13, 1986 | [DE] | Fed. Rep. of Germany | 3642688 |

[51] Int. Cl.[4] .......................................... F16C 15/00
[52] U.S. Cl. ................................. 29/434; 74/573 F
[58] Field of Search ................ 29/434; 74/573 F, 574; 464/64, 66, 68

[56] References Cited

U.S. PATENT DOCUMENTS

| 4,611,701 | 9/1986 | Friedmann | 192/110 B |
| 4,638,684 | 1/1987 | Maucher | 74/574 |
| 4,723,463 | 2/1988 | Reik et al. | 74/574 |
| 4,727,970 | 3/1988 | Reik et al. | 192/70.17 |
| 4,729,464 | 3/1988 | Friedmann | 192/70.17 |
| 4,732,250 | 3/1988 | Maucher et al. | 192/70.17 |
| 4,739,866 | 4/1988 | Reik et al. | 192/70.17 |

FOREIGN PATENT DOCUMENTS

| 3412961 | 10/1985 | Fed. Rep. of Germany | 464/64 |
| 2160296 | 12/1985 | United Kingdom | 464/64 |

Primary Examiner—Mark Rosenbaum
Assistant Examiner—Frances Chin
Attorney, Agent, or Firm—Peter K. Kontler

[57] ABSTRACT

A method of making a torsional vibration damping apparatus which is used in the power train between the engine and the transmission of a motor vehicle and wherein two flywheels are rotatable relative to each other against the oppositions of dampers in a fluid-containing annular chamber of the flywheel which is driven by the output shaft of the engine involves rotation of the chambered flywheel at 4000-7000 RPM during or immediately following admission of a viscous fluid medium into the chamber. Such rotation results in complete expulsion of air from the radially outermost portion of the chamber and renders it possible to properly balance the chambered flywheel in a next-following step. The balancing step includes rotating the chambered flywheel at 400-2000 RPM. Such balancing step can be carried out prior or subsequent to coupling of the chambered flywheel with the other flywheel.

25 Claims, 4 Drawing Sheets

METHOD OF MAKING APPARATUS FOR DAMPING TORSIONAL VIBRATIONS

CROSS-REFERENCE TO RELATED APPLICATION

The apparatus which can be produced in accordance with the method of the present invention is similar to those disclosed in the commonly owned copending patent application Ser. No. 063301 filed June 17, 1987, by Oswald Friedmann and Johann Jäckel for "Apparatus for damping vibrations". Other similar apparatus are described and shown in numerous additional pending United States patent applications as well as in numerous granted United States and foreign Letters Patent of the assignee.

BACKGROUND OF THE INVENTION

The invention relates to torsional vibration damping apparatus in general, and more particularly to improvements in torsional vibration damping apparatus wherein at least two flywheels are rotatable relative to each other against the opposition of one or more dampers which are installed in an annular chamber defined by one of the flywheels and containing a supply of viscous fluid medium. Such apparatus can be used in the power trains of motor vehicles, especially between the output shaft of an internal combustion engine and the input shaft of a change-speed transmission. It is customary to install a clutch, preferably a friction clutch, between the apparatus and the transmission. Still more particularly, the invention relates to improvements in methods of making such torsional vibration damping apparatus.

OBJECTS AND SUMMARY OF THE INVENTION

An object of the invention is to provide a method which renders it possible to complete the assembly of the torsional vibration damping apparatus in a simple, time-saving and inexpensive way.

Another object of the invention is to provide a method which renders it possible to accurately balance the flywheels and the entire apparatus.

A further object of the invention is to provide a method which ensures a long useful life of the apparatus and enhances the effectiveness of the assembled apparatus.

An additional object of the invention is to provide a novel and improved method of admitting and distributing a viscous fluid medium in the chamber of a flywheel in a torsional vibration damping apparatus.

Still another object of the invention is to provide a novel and improved method of treating component parts of apparatus which are used to damp torsional vibrations in the power trains between the output elements of engines and the input elements of transmissions in motor vehicles.

The method of the present invention involves the making of torsional vibration damping apparatus, particularly for use in the power trains of motor vehicles, wherein a composite flywheel has at least two flywheels including a first flywheel connectable with the engine of a motor vehicle and a second flywheel connectable with a transmission (such as by way of a clutch, particularly a friction clutch), wherein at least one of the first and second flywheels has an annular chamber for a supply of viscous fluid medium and wherein the first and second flywheels are angularly movable relative to each other against the opposition of one or more dampers in the chamber. The method comprises the steps of balancing at least the one (chambered) flywheel, and rotating the one flywheel and at least a part of the supply of fluid medium therein prior to the balancing step at a speed such that the fluid medium is uniformly distributed in the chamber in spite of its viscosity to a level at a constant distance from the axis of rotation of the one flywheel (i.e., so that the fluid medium in the chamber forms a ring having an inner surface at a constant distance from the axis of the one flywheel). The balancing step can include balancing only the one flywheel (i.e., prior to coupling of the first and second flywheels to each other) or the method further comprises the step of coupling the first and second flywheels to each other prior to the balancing step.

At least a portion of the supply of fluid medium can be admitted into the chamber prior to the rotating step. Alternatively or in addition to such step, at least a portion of the supply of fluid medium can be admitted into the chamber in the course of the rotating step.

The balancing step can include driving the one flywheel at a first rotational speed (particularly between 400 and 2000 RPM), and the aforementioned rotating step can include driving the one flywheel at a second rotational speed (preferably between 4000 and 7000 RPM, most preferably between 5000 and 6000 RPM) which is between two and fifteen times the first speed.

The rotating step can include driving the one flywheel at the selected speed (preferably between 4000 and 7000 RPM) for an interval of 30–180 seconds, preferably for an interval of approximately 60 seconds.

The one flywheel can be heated not later than in the course of the rotating step so as to promote the distribution of fluid medium in the chamber by reducing its viscosity. The same or a similar result can be achieved if the fluid medium is heated prior to admission into the chamber of the one flywheel, either prior to or in the course of the rotating step. The two heating steps can be resorted to in one and the same method, i.e., the one flywheel can be heated and the supply of fluid medium can be heated prior to admission into the heated flywheel. The one flywheel and/or the supply of fluid medium (prior to admission into the one flywheel) can be heated to a temperature of 80°–250° C.

The one flywheel can be provided with at least one inlet for admission of fluid medium into the chamber, and such inlet serves for admission of fluid medium into the chamber not later than in the course of the rotating step prior to sealing of the inlet by a plug or the like. The fluid medium can be injected or pressed into the chamber by way of the inlet or inlets.

The first and second flywheels can be coupled to each other and the damper or dampers can be installed in the chamber prior to the balancing step. As mentioned above, the two flywheels can be coupled to each other upon completed balancing of the one flywheel or prior to such balancing. Each flywheel can be balanced independently of the other flywheel or flywheels, and the fully assembled apparatus may but need not be balanced again. Alternatively the apparatus is completely assembled prior to any balancing step.

The fluid medium can have a pasty consistency, e.g., in the form of grease. Regardless of its consistency, the fluid medium can constitute a lubricant.

The novel features which are considered as characteristic of the invention are set forth in particular in the appended claims. The improved method itself, however, together with additional features and advantages thereof, will be best understood upon perusal of the following detailed, description of certain specific embodiments of apparatus which are treated in accordance with the method and are shown in the accompanying drawing.

DESCRIPTION OF THE PREFERRED EMBODIMENTS

Figure 1:
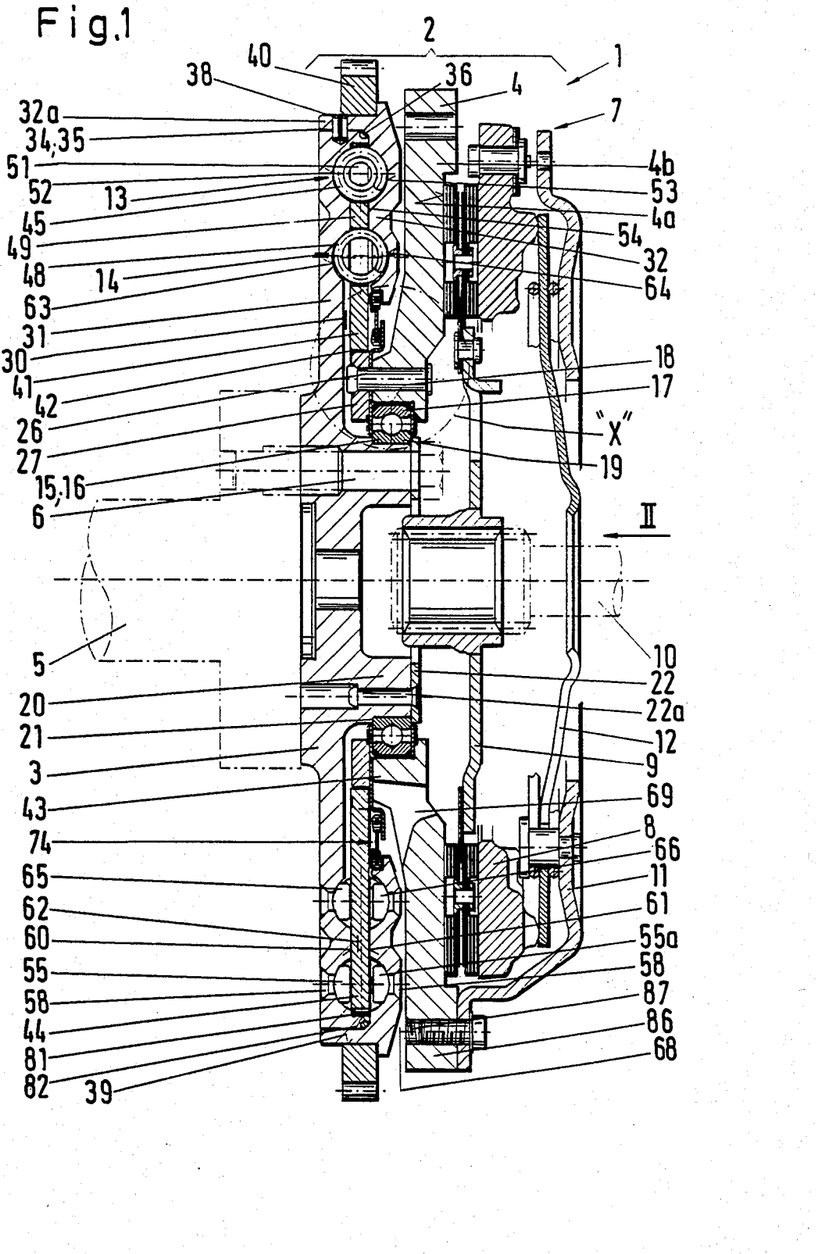
FIG. 1 is an axial sectional view of an apparatus which is assembled and balanced in accordance with a method embodying one form of the invention.
Figure 1A:
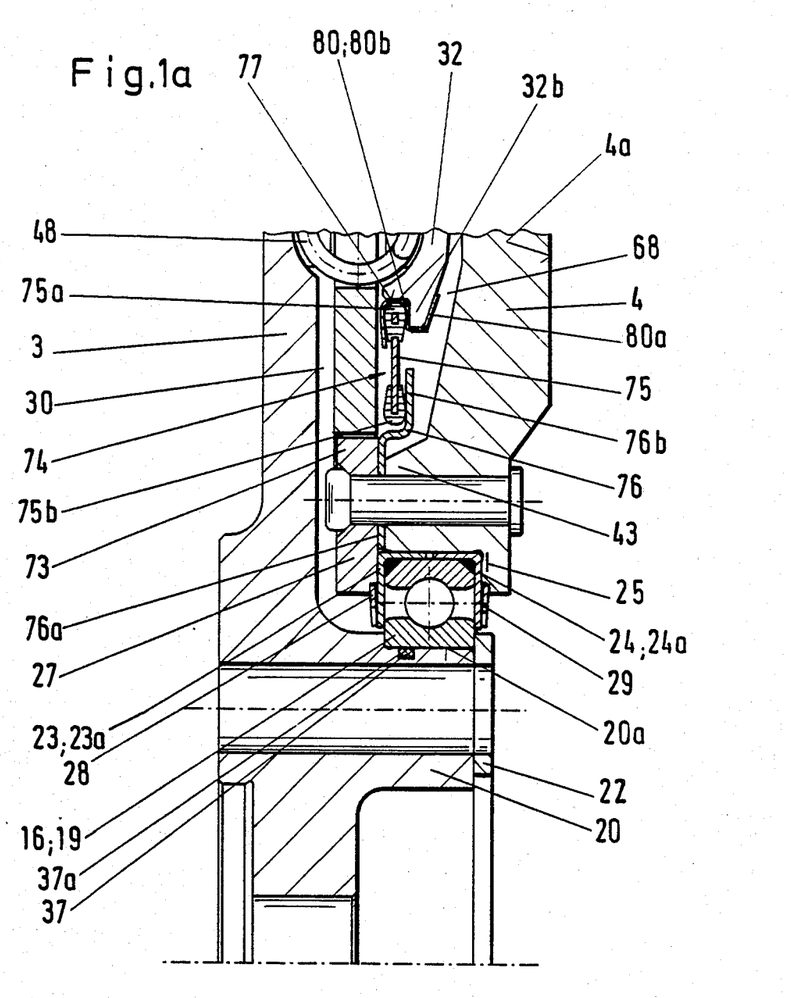
FIG. 1a is an enlarged view of the detail within the phantom-line circle "X" in FIG. 1.
Figure 2:
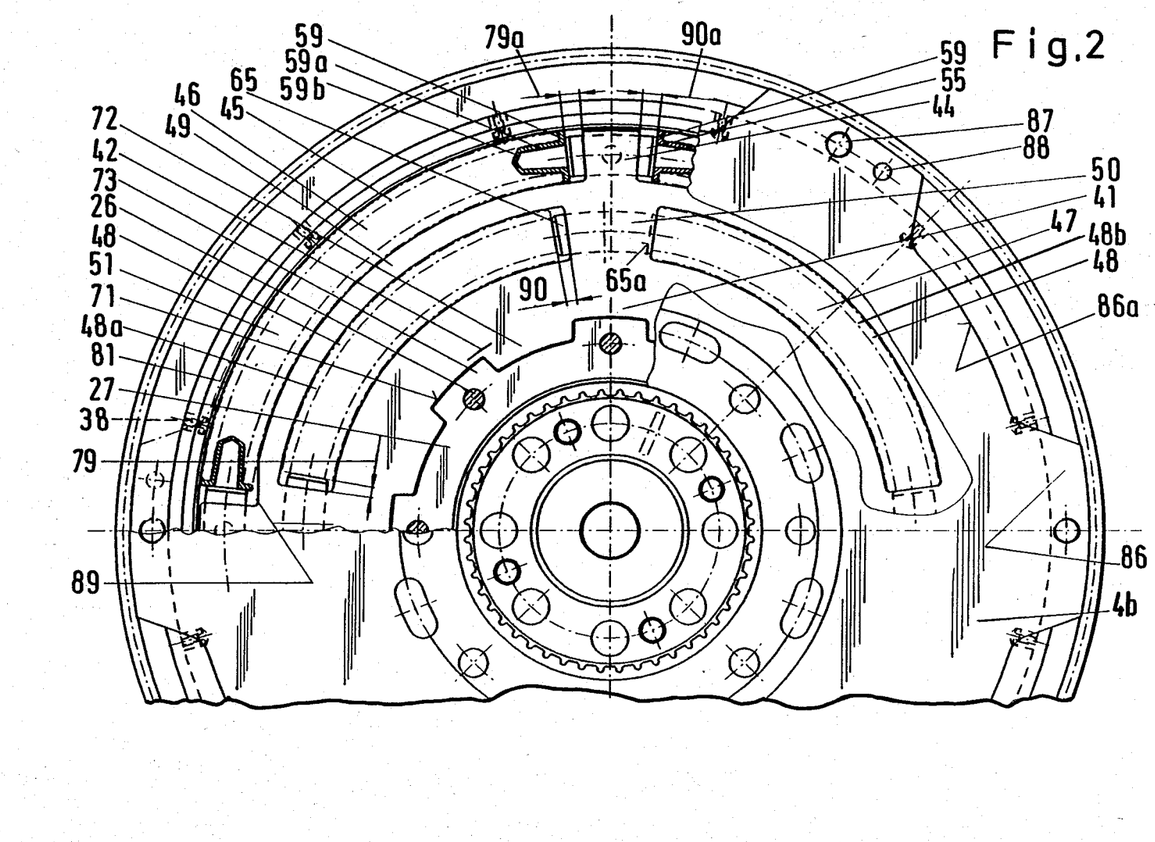
FIG. 2 is a fragmentary end elevational view as seen in the direction of arrow II in FIG. 1, with the friction clutch omitted and with certain other parts broken away.

Referring first to FIGS. 1, 1a and 2, there is shown a torsional vibration damping apparatus 1 which comprises a composite flywheel 2 including a discrete first component or flywheel 3 which is affixed to the output element 5 (e.g., a crankshaft) of an internal combustion engine by bolts 6 or other suitable fastener means, and a discrete second component or flywheel 4 which can be connected with the input shaft 10 of a change-speed transmission in a motor vehicle by a friction clutch 7.

The friction clutch 7 comprises a pressure plate 8 which is adjacent but spaced apart from the radially extending friction surface 4a of the flywheel 4 and is normally biased toward the flywheel 4 by a diaphragm spring 12 which is tiltably mounted between two annular seats at the inner side of a clutch cover 11 affixed to the flywheel 4. The input shaft 10 of the change-speed transmission is surrounded and can be rotated by the hub of a clutch plate or clutch disc 9 which has two sets of friction linings extending between the friction surface 4a of the flywheel 4 and the adjacent surface of the pressure plate 8. The means (not shown) for disengaging the friction clutch 7 can comprise an antifriction bearing which can be caused to bear against the radially inwardly extending prongs of the diaphragm spring 12 and to change the conicity of the spring 12 to the extent which is necessary to reduce friction between the friction linings of the clutch plate 9 on the one hand and the flywheel 4 and pressure plate on the other hand so that the flywheel 4 can rotate with reference to the input shaft 10 and/or vice versa. The flywheel 4 and the parts 8, 11, 12 of the friction clutch 7 rotate as a unit.

The flywheels 3 and 4 can turn relative to each other, and such angular movements are opposed by a first or outer damper 13 as well as by a second or inner damper 14 of the torsional vibration damping apparatus 1. The dampers 13 and 14 operate in parallel.

An antifriction bearing unit 15 including an antifriction ball bearing 16 is installed between the flywheels 3 and 4. The bearing 16 has an inner race 19, an outer race 17 and a single row of spherical antifriction rolling elements between the two races. The outer race 17 is installed in an axial recess 18 of the flywheel 4, and the inner race 19 is mounted on an axial protuberance 20 which is an integral part of the flywheel 3 and extends in a direction away from the output element 5 and into the recess 18 of the flywheel 4. The inner race 19 is preferably a press fit on a cylindrical portion 20a (FIG. 1a) of the peripheral surface of the protuberance 20 and abuts an annular shoulder 21. The means for maintaining the inner race 19 in abutment with the shoulder 21 comprises a washer-like retaining ring 22 which is affixed to the end face of the protuberance 20 by rivets 22a (only one can be seen in FIG. 1).

FIG. 1a shows that the outer race 17 is held in a predetermined axial position with reference to the flywheel 4 by a thermal barrier including two rings 23, 24 each of which has a substantially L-shaped cross-sectional outline. The radially inwardly extending portion 24a of the ring 24 abuts a shoulder 25 in the internal surface of the flywheel 4. The radially inwardly extending portion 23a of the ring 23 abuts a disc 27 which is secured to the flywheel 4 by a set of rivets 26.

The portions 23a, 24a of the rings 23, 24 extends radially inwardly beyond the outer race 17 of the bearing 16 and along the respective end faces of the inner race 19 to prevent, or to interfere with, the escape of lubricant from the space between the races 17 and 19. To this end, the rings 23 and 24 can be installed in prestressed condition so that their radially extending portions 23a, 24b bear against the respective end faces of the inner race 19 with a force which suffices to ensure the establishment of a satisfactory sealing action. In addition, the flywheel 4 can carry two resilient elements 28, 29 which respectively bias the radially inwardly extending portions 23a, 24a of the rings 23, 24 against the respective end faces of the inner race 19. The resilient element 28 is or can constitute a first diaphragm spring which reacts against the disc 27 and bears against the portion 23a of the ring 23. The resilient element 29 is or can constitute a second diaphragm spring which reacts against the flywheel 4 and bears against the radially innermost part of the radially inwardly extending portion 24a of the ring 24.

A sealing element 37 (e.g., an O-ring) is installed in a groove 37a which is machined into the cylindrical portion 20a of the peripheral surface of the protuberance 20 of the flywheel 3 and is surrounded by the inner race 19 of the antifriction bearing 16.

FIG. 1 shows that the flywheel 3 includes two substantially shell-shaped parts or sections 31 and 32 which define an annular chamber 30 extending radially inwardly to the antifriction bearing 16 and being sealed from the atmosphere by a plurality of seals including the sealing element 37. The dampers 13 and 14 are installed in the chamber 30. The parts or sections 31, 32 of the flywheel 3 are castings and the section 32 has an axially extending cylindrical portion 32a which constitutes the radially outermost wall for the chamber 30 and carries a ring-shaped starter gear 40. The cylindrical internal surface 35 of the cylindrical portion 32a serves as a means for centering the peripheral surface 34 of the section 31. The means for preventing axial movements of the sections 31, 32 relative to each other comprises a set of radially extending pins 38 each of which can constitute a so-called heavy type dowel pin and extends into registering radially extending holes of the cylindrical portion 32a and section 31. The pins 38 extend across the cylindrical surfaces 34 and 35 and are confined in their respective holes by the starter gear 40. The gear 40 is mounted on a cylindrical peripheral surface 39 of the portion 32a and abuts a shoulder of the flywheel 3.

The radially outermost portion of the chamber 30 is sealed from the atmosphere by a sealing element 36 (e.g., an O-ring) which is installed in a groove of the surface 34 and bears against the surface 35 inwardly of the set of radially extending pins 38.

The dampers 13 and 14 comprise a common output member in the form of a radial flange 41 which is disposed between the sections 31, 32 of the housing forming part of the flywheel 3 and defining the chamber 30. As shown in FIG. 2, the radially innermost portion of the flange 41 forms part of a connection or coupling 42 which serves to establish a torque transmitting connection between the flange 41 and the disc 27 in such a way that the parts 27, 41 can be moved into or from torque-transmitting engagement by shifting the disc 27 axially of the flange 41 and/or vice versa. As mentioned above, the disc 27 is non-rotatably affixed to the flywheel 4 (and more particularly to an axial projection or extension 43 of the flywheel 4) by a set of rivets 26.

The periphery of the flange 41 is provided with radially outwardly extending arms 44 which constitute abutments for the respective end portions of energy storing elements in the form of coil springs 45. The coil springs 45 are constituents of the outer damper 13. The arms 44 alternate with recesses 46 for the coil springs 45, as considered in the circumferential direction of the flange 41, and such recesses 46 are disposed radially inwardly of arcuate windows 47 for energy storing elements (coil springs) 48 of the inner damper 14. The flange 41 is further formed with elongated arcuate ribs or webs 49 which are disposed between the recesses 46 and the windows 47 (as seen in the radial direction of the flange 41) and are integral with radially extending webs 50 between the coil springs 48. The coil springs 48 react against the respective webs 50.

The annular chamber 30 of the flywheel 3 has an arcuate compartment 51 which constitutes its radially outermost portion and receives the arms 44 of the flange 41. The compartment 51 is formed in part by mirror symmetrical arcuate grooves 52 and 53 which are respectively provided in the confronting sides or surfaces of the sections 31 and 32 of the flywheel 3. The grooves 52, 53 receive the respective portions of the coil springs 45, namely those portions of springs 45 which extend axially beyond the adjacent sides of the flange 41. The radially innermost portion of the compartment 51 is substantially sealed from the remaining portion of the chamber 30 by the arcuate ribs 49 of the flange 41. The arrangement is such that the ribs 49 and at least one of the sections 31, 32 define a rather narrow clearance or gap 54 by way of which the compartment 51 can communicate with the remaining portion of the chamber 30; this gap constitutes a flow restricting orifice for the flow of a viscous fluid medium.

FIG. 1 shows that the dimensions of the grooves 52, 53 are selected with a view to ensure that the surfaces bounding such grooves are closely adjacent the respective coil springs 45. This enables the coil springs 45 to assume a predetermined curvature and to be guided by the adjacent portions of the surfaces bounding the grooves 52 and 53. Moreover, a large-area contact between the coil springs 45 and the surfaces bounding the grooves 52, 53 is desirable and advantageous in many instances because this reduces the likelihood of localized wear upon the convolutions of such springs and prolongs the useful life of the damper 13.

In order to reduce wear upon the housing 31, 32 of the flywheel 3 is the region of the radially outermost portion of the compartment 51, the flywheel 3 is preferably provided with a strip- or band-shaped wear-resistant frictional engagement reducing member or insert 81 which is a short cylinder and is made of a highly wear-resistant material, such as steel. The member 81 is received in a shallow recess 82 of the housing 31, 32. When the apparatus 1 rotates about the axis of the antifriction bearing 16, the coil springs 45 of the damper 13 are acted upon by centrifugal force and their radially outermost portions bear against the internal surface of the cylinderical member 81 in the recess 82.

The compartment 51 of the chamber 30 further contains abutments or stops 55, 55a for the end portions of the coil springs 45, and such abutments are respectively installed in the grooves 52 and 53. The abutments 55, 55a can be formed by forging, in a press or in a stamping machine and are secured to the respective sections 31, 32 of the housing for the chamber 30 by rivets 58. Those surfaces of the abutments 55, 55a which are in contact with neighboring convolutions of the respective coil springs 45 are or can be flattened to ensure a more predictable engagement with the coil springs. Each of the arms 44 is flanked by a pair of abutments 55, 55a.

FIG. 2 shows that the circumferential length of the abutments 55, 55a exceeds the circumferential length of the respective arms 44. The coil springs 45 are shown in their neutral positions, and each of the arms 44 is located substantially midway between the corresponding abutments 55, 55a. In other words, the abutments 55, 55a project circumferentially beyond the respective arms 44 to the same extent in a clockwise as well as in a counterclockwise direction.

The compartment 51 of the chamber 30 is located radially outwardly of two ring-shaped surface portions 60, 61 on the sections 31 and 32, respectively. These surface portions define a ring-shaped passage 62 for the flange 41. The non-occupied portion of the passage 62 constitutes the aforementioned clearance or gap 54. The gap 54 can include two portions, namely a first portion between the flange 41 and the surface portion 60 and a second portion between the flange 41 and the surface portion 61.

The sections 31, 32 to the flywheel 3 are formed with additional mirror symmetrical arcuate grooves 63, 64 which are disposed radially inwardly of the passage 62 and together form a second compartment for the coil springs 48 of the inner damper 14. More specifically, the grooves 63, 64 receive those portions of the coil springs 48 which extend axially of the apparatus 1 beyond the respective sides of the flange 41. FIG. 1 shows that the grooves 63 and 64 are bounded by concave surfaces which closely follow the outlines of the coil springs 48. This reduces the likelihood of buckling and/or other undesirable deformation of coil springs 48, particularly in the axial direction of the flywheel 3. In addition, such configuration of surfaces bounding the grooves 63, 64 ensures that the shape of the coil springs 48 cannot appreciably deviate from a desired configuration.

The grooves 52, 53 and 63, 64 preferably extend circumferentially of the flywheel 3 along arcs of 360 degrees. This is desirable and advantageous because such grooves can be machined and/or the surrounding surfaces treated at a reasonable cost in a milling or like machine.

The grooves 63, 64 receive abutments or stops 65, 66 for the end convolutions of the coil springs 48, and these abutments can be configured and/or manufactured and/or mounted in the same way as described for the abutments 55, 55a in the grooves 52 and 53 of the compartment 51. Thus, the abutments 65, 66 can be forged or made in a press, and they are riveted to the respective sections 31, 32 of the housing for the chamber 30. These abutments flank the radially extending webs 50 of the flange 41 and each thereof is longer (as considered in the circumferential direction of the flywheel 3) than the corresponding web 50. FIG. 2 shows that, when the apparatus 1 is idle, the abutments 65, 66 extend beyond one side of the respective web 50 but are substantially flush with the other side of such web. In addition, the abutments 65, 66 are preferably offset with reference to the respective webs 50 in such a way that two successive abutments 65 or 66 are offset with reference to the associated webs 50 in opposite directions, as considered circumferentially of the flywheel 3. In this manner, the coil springs 48 are divided into a first group or set 48a of two coil springs and a second group or set 48b of two coil springs 48. The arrangement is such that the coil springs 48 of one of these groups begin to store energy (or to store additional energy) later than the coil springs 48 of the other group.

The dimensions of the arcuate ribs 49 of the flange 41 with reference to the dimensions of the arcuate grooves 63, 64 are selected in such a way that the ribs are engaged by the radially outermost portions of the coil springs 48 at least while the apparatus 1 rotates and the coils springs 48 are acted upon by centrifugal force. This is desirable and advantageous because the flange 41 can be made of a highly water-resistant material (such as steel) and its ribs 49 then perform the function of the aforementioned cylindrical strip- or band-shaped member 81 in the recess 82 radially outwardly of the coil springs 45 forming part of the outer damper 13. It is not necessary that the entire flange 41 be made of a high-quality hardened steel; it often suffices to merely harden the entire surface or selected portions of the surface of the flange 41, e.g., along the internal surfaces of the ribs 49 which are contacted by the coil springs 48 when these springs 48 are acted upon by centrifugal force.

FIG. 2 shows cup-shaped spring retainers 59 which are installed between the arms 44 and/or abutments 55, 55a and the respective end convolutions of the adjacent coil springs 45. The configuration of the retainers 59 is preferably selected in such a way that they fill the respective portions of the compartment 51. Each retainer 59 is preferably provided with a slightly conical extension or stub 59a terminating in a conical or roof-shaped tip 59b. The conical extensions or stubs 59a can be replaced with substantially spherical extensions without departing from the spirit of the invention. Conical or spherical extensions 59a are desirable and advantageous because this ensures that the extensions can find their way into the adjacent end portions of the respective coil springs 45 subsequent to such angular displacement of the coil springs 45 and of the adjacent retainers 59 relative to each other that the retainers become temporarily detached from the respective end portions of the adjacent coil springs. All that is necessary is for the retainers 59 to move toward the respective coil springs 45 and/or that these coil springs expand in order to ensure automatic and predictable reentry of conical or spherical extensions 59a into the end portions of the respective coil springs. The extensions 59a are likely to be extracted from the end portions of the adjacent coil springs 45 if these springs 45 are compressed and the apparatus 1 is rotated at a relatively high speed. At such time, friction between the convolutions of the coil springs 45 and the surfaces surrounding the grooves 52, 53 can be so pronounced that the coil springs 45 cannot always fully expand in immediate response to an abrupt change of load so that the extensions 59a move away from their end portions.

The viscous fluid medium in the chamber 30 is displaced by the arms 44 of the flange 41 in response to each change of load, and this can also cause separation of extensions 59a from the respective end portions of the coil springs 45. The fluid medium distributes itself in the compartment 51 under the action of centrifugal force and is forced circumferentially of the compartment in response to movement of the flange 41 relative to the housing sections 31, 32. The medium can cause separation of extensions 59a from the respective end portions of the coil springs 45 while it flows circumferentially of the compartment 51 under the action of the arms 41 or thereafter when it is acted upon solely by centrifugal force.

The viscous fluid medium in the chamber 30 is preferably a lubricant, such as grease. The quantity of fluid medium in the chamber 30 can be selected in such a way that, when the apparatus 1 rotates, the fluid medium fills the compartment 51 at least to the level of the axes of coil springs 45 forming part of the outer damper 13. However, it is often preferred to select the quantity of fluid medium in such a way that it fills the compartment 51 and extends inwardly into the compartment including the grooves 63 and 64 so that it is in contact at least with the radially outermost portions of coil springs 48 forming part of the inner damper 14. This ensures adequate lubrication of the region of frictional engagement between the radially outermost portions of the coil springs 48 and the arcuate ribs 49 of the flange 41. In accordance with a presently preferred embodiment, the quantity of viscous fluid medium in the chamber 30 is selected in such a way that the medium fills the compartment 51 and the recess 82 as well as the clearance or gap 54 and the compartment including the grooves 63, 64 to the level of the axes of coil springs 48.

An advantage of the feature that the chamber 30 is provided in that flywheel (3) which is nearer to the engine, i.e., that the chamber 30 is remote from the locus of frictional engagement between the surface 4a of the flywheel 4 and the respective set of friction linings on the clutch disc 9, is that heat which is generated in response to engagement or disengagement of the friction clutch 7 cannot unduly affect (or does not affect at all) the viscous fluid medium in the chamber 30. The likelihood of excessive heating or any heating of viscous fluid medium in the chamber 30 by heat which is generated by the friction clutch 7 is further reduced by the provision of a radially extending ventilating channel 68 which is disposed between the section 32 of the flywheel 3 and the flywheel 4. The radially outermost portion of the channel 68 is open and the radially innermost portion of this channel communicates with passages 69 which are provided in the flywheel 4 radially inwardly of the chamber 30 and of the friction surface 4a.

The flange 41 has a centrally located opening 71 (FIG. 2) which is bounded by tooth-like projections 72 mating with complementary radially outwardly extending tooth-like projections 73 at the periphery of the disc 27 which rotates with the flywheel 4. These projections jointly form the aforementioned connection or coupling 42 which transmits torque between the flange 41 and the flywheel 4. In addition, the projections 72 and 73 allow for proper positioning of the flange 41 between the sections 31, 32 of the flywheel 3 which, in turn, renders it possible to reduce the cross-sectional area of the aforementioned clearance or gap 54 between the flange 41 and the section 31 and/or 32. Still further, the connection or coupling 42 renders it possible to compensate for axial tolerances between the neighboring surfaces of component parts of the apparatus 1.

The radially innermost portion of the chamber 30 is sealed by a sealing device 74 which is shown in detail in FIG. 1a. This sealing device is installed between the radially innermost portion 32b of the section 32 of the flywheel 3 and the radially outermost portion of the disc 27 on the axially extending projection 43 of the flywheel 4. An axially elastic washer-like sealing member 75 of the device 74 has a radially innermost annular portion abutting a ring-shaped insert 76 having a radially innermost portion 76a which is sealingly clamped between the projection 43 of the flywheel 4 and the disc 27, and a radially outermost portion which is held in an axially fixed position by the radially innermost portion 32b of section 32 of the flywheel 4. The sealing member 75 acts not unlike a diaphragm spring and bears against the adjacent dished radially outermost portion 76b of the insert 76 with a preselected force. The radially innermost and radially outermost portions of the sealing member 75 respectively carry layers or coats 75b, 75a of synthetic plastic material which can be sprayed or otherwise applied to the member 75. The material of the layers 75a, 75b is selected in such a way that its friction coefficient is low; moreover, the material of the layers 75a, 75b is preferably capable of undergoing a certain amount of elastic or plastic deformation.

The layer 75a is sealingly confined in a socket-like portion 80b of a ring-shaped carrier 80 in a notch 77 provided therefor in the radially innermost portion 32b of the section 32. The carrier 80 further comprises a collar 80a which overlies the right-hand side of the innermost portion 32b opposite the notch 77 to ensure that the carrier is reliably mounted on the section 32 against any axial movement. The layer 75a has a convex external surface so that it allows for a certain amount of tilting and hence for a certain change of conicity of the sealing member 75 with reference to the carrier 80 and insert 76. The carrier 80 can be said to constitute a bearing which enables the coat or layer 75a on the sealing member 75 to swivel in the socket 80b together with the entire sealing member 75 which, as mentioned above, acts not unlike a diaphragm spring and urges the layer 75b into sealing engagement with the radially outermost portion 76b of the insert 76. The sealing member 75 is installed in prestressed condition so that it remains in sealing engagement with the portion 76b of the insert 76 even after the insert and/or the layer 75b has undergone a certain amount of water.

The portion 76b of the insert 76 is dished, i.e., it is axially offset with reference to the portion 76a and with reference to the projections 73 of the disc 27 in a direction away from the flywheel 3. The sealing device 74 prevents escape of viscous fluid medium from the chamber 30 into the ventilating channel 68 between the section 32 and the flywheel 4.

In order to allow for convenient assembly of the flywheels 3 and 4 (in the axial direction of the antifriction bearing 16), the inner diameter of the sealing member 75 exceeds the outer diameter of the annulus which is formed by the radially outwardly extending projections 73 of the disc 27. The radially outermost portion 76b of the inert 76 extends radially outwardly beyond the annulus of projections 73 on the disc 27.

The connection or coupling 42 and the sealing device 74 allow for an extremely simple and rapid assembly of the apparatus 1. In the first step, the flywheels 3 and 4 are assembled with the associated parts and are thereupon coupled to each other by inserting the protuberance 20 into the recess 18 of the flywheel 4 before the retaining ring 22 is riveted or otherwise secured to the end face of the protuberance 20. The sealing device 74 is mounted on the section 32 of the flywheel 3 before the latter is assembled with the flywheel 4. The antifriction bearing 16 is installed in the recess 18 of the flywheel 4 before the latter is coupled to the flywheel 3. Such coupling involves slipping the inner race 19 of the bearing 16 onto the cylindrical portion 20a of the peripheral surface of the protuberance 20 whereby the tooth-like projections 73 of the disc 27 move into mesh with the tooth-like projections 72 of the flange 41. As the inner race 19 is being slipped onto the protuberance 20, the inner layer 75b on the sealing member 75 is engaged by the radially outermost portion 76b of the insert 76 whereby the sealing member 75 undergoes a certain amount of deformation to resemble a frustoconical diaphragm spring. This ensures the establishment of a reliable seal between the insert 76 and the sealing member 75 along the entire layer 75b. As mentioned above, the assembly is completed when the retaining ring 22 is affixed to the end face of the protuberance 20 so that it overlies the adjacent end face of the inner race 19 and urges the latter against the shoulder 21.

The mode of operation of the apparatus 1 is as follows:

If the flywheel 4 is caused to turn with reference to the flywheel 3 from the neutral or starting position of FIG. 2, the connection or coupling 42 causes the flange 41 to share such angular movement of the flywheel 4 and turns with reference to the sections 31, 32 of the flywheel 3. This results in compression of the group 48b of coil springs 48 in the compartment including the grooves 63, 64 of the sections 31, 32 between the respective abutments 65, 66 and the radially extending webs 50 of the flange 41. When the flywheel 4 completes an angle 79 in one direction or an angle 90 in the other direction, the radially extending webs 50 of the flange 41 engage the coil springs 48 of the group 48a so that the coil springs 48 of the group 48a begin to store energy and the coil springs 48 of the group 48b continue to store energy in response to further angular displacement of the flywheel 4 with reference to the flywheel 3. When the flywheel 4 completes an angle 79a in one direction or an angle 90a in the opposite direction, the arms 44 of the flange 41 begin to stress the coil springs 45 which store energy because they are acted upon by the arms 44 as well as by the abutments 55, 55a if the flywheel 4 continues to turn with reference to the flywheel 3. In the embodiment which is shown in FIGS. 1, 1a and 2, the angles 79 and 90 respectively match the angles 79a and 90a, i.e., the coil springs 48 of the group 48a begin to store energy simultaneously with the coil springs 45. Thus, the coil springs 45 and 48 store energy in two stages the first of which involves compression of coil springs 48 in the group 48b and the second of which involves compression of coil springs 48 in the group 48a as well as compression of coil springs 45. It is possible to select the positions of webs 50, arms 44 and abutments 55, 55a and 65, 66 in such a way that the angle 79 partially overlaps the angle 79a and the angle 90 partially overlaps the angle 90a (or such angles can be entirely different) so that compression of coil springs 45, 48 in the dampers 13, 14 takes place in three or even more stages. For example, the arrangement may be such that the dampers 13, 14 have a two-stage characteristic curve in one direction and a three-stage characteristic curve in the opposite direction of rotation of one of the flywheels 3, 4 with reference to the other flywheel. Alternatively, the characteristic curve can have at least two stages in one direction and at least three stages in the opposite direction.

FIG. 2 shows by dot-dash lines (at 65a) that the abutments 65, 66 can be recessed with reference to those end portions of the coil springs 48 of the group 48b which are engaged by the respective webs 50 so that the initial stage of angular displacement of the flywheel 3 relative to the flywheel 4 and/or vice versa does not entail any compression of coil springs 48 and/or 45, i.e., such initial stage of angular displacement is damped solely by the viscous fluid medium in the chamber 30 and/or by friction between parts which turn relative to each other (e.g., between the sealing member 75 of the sealing device 74 and the insert 76).

In the apparatus 1 of FIGS. 1, 1a and 2, the coil springs 45 and the coil springs 48 of the groups 48a and 48b undergo compression at the same time until at least one of the coil springs 48 in the group 48 is incapable of undergoing additional compression, i.e., when such spring begins to act as a solid body. This completes the angular displacement of the flywheel 4 relative to the flywheel 3 and/or vice versa.

Angular displacement of one of the flywheels 3, 4 relative to the other flywheel further entails the development of a damping action which is due to frictional engagement of the coil springs 45 in the compartment 51 with the cylindrical member 81 and with the surfaces bounding the grooves 52, 53 in the sections 31, 32. Moreover, and as mentioned above, the layer 76b of the sealing member 75 rubs against the insert 76. Additional friction-induced damping action takes place as a result of sliding movement of the convolution of coil springs 48 with reference to the ribs 49 of the flange 41 and with reference to the surfaces surrounding the grooves 63, 64 in the sections 31, 32 of the flywheel 3. The magnitude of the friction-generated damping action depends upon the RPM of the apparatus 1, i.e., such damping action can be intensified by increasing the RPM of the apparatus.

Additional damping action is produced by the viscous fluid medium in the chamber 30. Such medium is agitated and displaced by the arms 44 of the flange 41 and by the cup-shaped spring retainers 59 each of which acts not unlike a piston or plunger and displaces the fluid medium in the compartment 51 of the chamber 30. As mentioned above, the compartment 51 communicates with the compartment including the grooves 63, 64 solely by way of the normally very narrow gap 54 so that the flow of fluid medium between the two compartments is obstructed by the flow restrictor including the ribs 49 of the flange 41 and the adjacent portions of the sections 31, 32. The resulting hydraulic or viscous damping action of the fluid medium in the chamber 30 contributes significantly to the overall damping action.

When the coil springs 45 in the compartment 51 undergo compression by the arms 44 in conjunction with the abutments 55, 55a, the arms 44 advance the respective retainers 59 toward the retainers which engage the confronting abutments 55, 55a so that the retainers 59 which move relative to the associated retainers 59 cooperate with such associated retainers to urge the fluid medium out of the compartment 51 and radially inwardly into and through the gap 54. The flow restrictor which forms such gap opposes the flow of fluid medium into the compartment including the grooves 63, 64 so that at least some of the fluid medium in the compartment 51 flows around the retainers 59 which then cooperate with the sections 31, 32 to act not unlike flow restrictors and to produce an additional damping action. When the angular displacement of one of the flywheels 3, 4 relative to the other flywheel is terminated or interrupted, the fluid medium follows the action of centrifugal force and flows back into and fills the compartment 51. If the coil springs 45 are free to expand, they cause the retainers 59 to again act not unlike plungers or pistons and to produce a hydraulic or viscous damping action by causing some of the fluid medium to flow between their peripheral surfaces and the surfaces bounding the grooves 52, 53. Some of the fluid medium is also forced radially inwardly through the gap 54 which results in the generation of additional hydraulic or viscous damping action. The magnitude of the damping action which is produced by the fluid medium depends on the rotational speed of the apparatus 1 (i.e., on the magnitude of centrifugal force acting upon the fluid medium). Such damping action is intensified in response to increasing RPM of the apparatus 1. An additional desirable damping action is produced by the convolutions of the expanding or contracting coil springs 45 because such changes in the length of these springs cause turbulence in the fluid medium filling the compartment 51.

The retainers 59 can be designed to enhance or weaken the damping action of the fluid medium which flows between their peripheral surfaces and the surfaces bounding the grooves 52, 53. For example, one or more retainers 59 can be provided with peripheral notches or with holes or bores (not shown) to thereby select the resistance which the thus configurated retainers offer to the flow of fluid medium therethrough or therearound. Analogously, the width of the gap 54 can be varied or selected with a view to achieve a certain damping action as a result of the flow of fluid medium between the compartment 51 and the compartment including the grooves 63, 64. Still further, the diameters of the retainers 59 can be reduced or increased to further contribute to selection of a desired damping action by the fluid medium. For example, the retainers 59 can include one or more retainers having a first maximum diameter and one or more retainers having a different second maximum diameter. Additional influencing of the hydraulic or viscous damping action can be achieved by removing one or more retainers, i.e., by leaving one or both end portions of one or more coil springs 45 without retainers.

It is equally possible to provide retainers for the end portion or portions of one or more coil springs 48 in the compartment including the grooves 63 and 64.

As can be seen in FIG. 2, the portion 4b of the flywheel 4 is provided with radially outwardly extending projections 86 which are formed with tapped bores or holes 87 for screws, bolts or analogous fastener which secure the friction clutch 7 to the flywheel 4. At least some of the projections 86 can be provided with bores or holes 88 for pins (not shown) which allow for highly accurate centering of the clutch cover 11 on the flywheel 4. The provision or recesses 86a between neighboring projections 86 contributes to a reduction of the weight of the flywheel 4. Moreover, the recesses 86a constitute passages for the circulation of air which cools the flywheel 4 and the friction clutch 7 when the apparatus 1 is driven. Such air flows between the flywheel 4 and the cover 11 of the friction clutch 7.

If the flywheel 4 is to have a certain mass or weight, the provision of recesses 86a between the projections 86 renders it possible to employ a flywheel which is thicker in the region of the friction surface 4a to thus reduce the likelihood of overheating of the flywheel 4 along the surface 4a.

The damping action of the fluid medium in the compartment 51 of the chamber 30 can be regulated in a number of additional ways. For example, it is possible to provide the sections 31, 32 with grooves 52, 53 which include portions of different depth or cross-sectional area. A readily detectable change of hydraulic or viscous damping action can be achieved if the cross-sectional area of the compartment 51 is not constant in the region of at least one of the coil springs 45. By enlarging one or more portions of the compartment 51, one ensures that such portions offer a lesser resistance to the flow of fluid medium therethrough than the portions where the convolutions of the springs 45 are immediately adjacent the surfaces bounding the grooves 52 and 53. Such enlargement of the cross-sectional area of the compartment 51 can be made at any desired location as seen in the circumferential direction of the flywheel 3. However, it has been found to be of particular advantage if such enlarged portions are located next to the end portions of coil springs 45 when the coil spring are not under stress (i.e., when the flywheels 3 and 4 are held in the neutral positions of FIG. 2). The transitions between enlarged and narrowed portions of the compartment 51 can be gradual or abrupt. It is presently preferred to provide one or more enlargements in the radially innermost portion of the compartment 51, i.e., immediately adjacent the ribs 49 of the flange 41 and the ring-shaped passage 62. One such enlarged portion is shown at 89 in the left-hand portion of FIG. 2; this enlarged portion is provided in the respective rib 49 of the flange 41, i.e., in that portion of the flange which seals or practically seals the respective portion of the passage 62. It is clear that the enlarged portion or portions need not be provided only in the flange 41; for example, one or more enlarged portions (in addition to or in lieu of one or more enlarged portions 89 in the flange 41) can be provided in the section 31 and/or in the section 32 of the flywheel 3.

The viscous fluid medium can be introduced into the chamber 30 prior to coupling of the flywheels 3 and 4 to each other. If the axis of the flywheel 3 during introduction of fluid medium into the chamber 30 is horizontal and the viscosity of the fluid medium is low, the medium can fill the chamber 30 up to the level of the lowermost part of the layer 75b on the sealing member 75. If the chamber 30 is to receive additional (i.e., a larger quantity of) readily flowable fluid medium, it is necessary to first complete the assembly of the apparatus 1 so as to ensure that the radially innermost portion of the chamber 30 will be adequately sealed as a result of sealing engagement between the layer 75b on the sealing member 75 and the radially outermost portion 76b of the insert 76. The admission of fluid medium into the chamber 30 prior to coupling of the flywheels 3, 4 to each other renders it possible to admit the medium through that portion of the chamber which is open prior to completion of the coupling step. This is the region between the radially innermost portion (layer 75b) of the sealing member 75 and the protuberance 20.

When the fluid medium (e.g., a viscous substance such as grease or another lubricant of pasty consistency) is to be admitted into the chamber 30, the flywheel 3 is set in rotary motion to rotate at a speed which suffices to ensure that the admitted fluid medium will be uniformly distributed in the radially outermost portion of the chamber 30 under the action of centrifugal force. Such mode of admitting the fluid medium is desirable and advantageous because it ensures that the fluid medium is uniformly distributed in the circumferential direction of the flywheel 3 and allows for a highly accurate balancing of the flywheel and of the entire apparatus 1. This holds true even if the fluid medium is a thick-flowing paste whose viscosity is not altered or is altered only negligibly in response to those changes of temperature which are anticipated in actual use of the apparatus. The flywheel 3 can be rotated at a speed of 4000–7000 RPM, preferably between 5000 and 6000 RPM. This speed is or can be higher than the maximum anticipated RPM of the apparatus 1 in actual use in the power train of a motor vehicle.

The flywheel 3 can be balanced prior to coupling it to the flywheel 4. The same applies for the flywheel 4, and the apparatus is or can be balanced upon completion of the coupling operation. It is also possible to balance the flywheels 3 and 4 individually without any additional balancing or to balance the apparatus 1 without previous balancing of the flywheel 3 and/or 4.

The aforementioned rotation of the flywheel 3 and of the supply of fluid medium therein at a speed of 4000–7000 (preferably 5000–6000) RPM can take place for an interval of 30 to 180 seconds. As a rule, an interval of one minute is quite satisfactory. The interval can be shortened without affecting the reliability of distribution of viscous fluid medium in the chamber 30 if the flywheel 3 and/or the fluid medium is heated prior to balancing to ensure that the viscosity of the fluid medium is reduced. Such reduction of viscosity contributes to an even more reliable uniform distribution of fluid medium in the chamber 30. Actual balancing of the flywheel 3 and/or 4 and/or apparatus 1 can take place while the flywheel or the apparatus is rotated at a speed of 400–2000 RPM.

Figure 3:
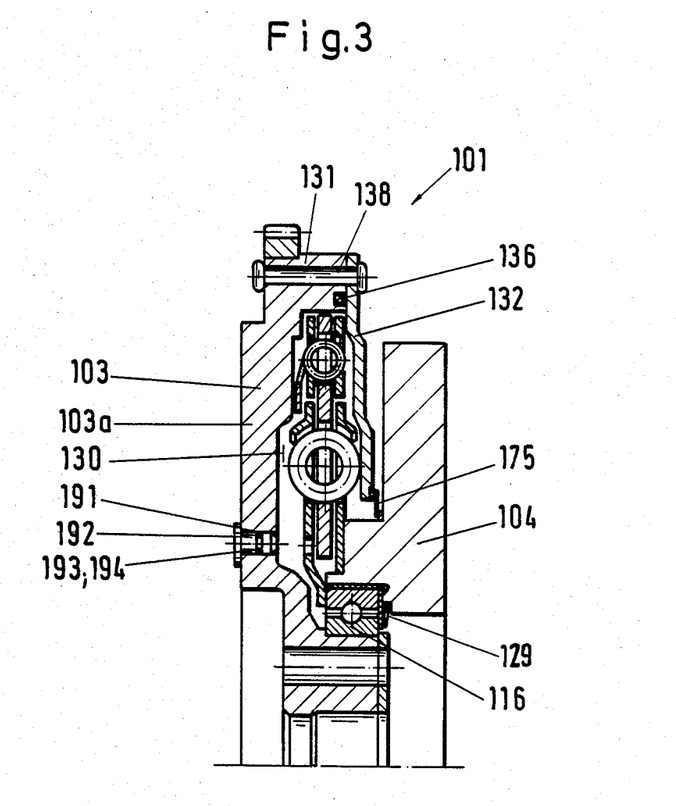
FIG. 3 is a fragmentary axial sectional view of a second apparatus.

FIG. 3 shows a portion of a modified apparatus 101 wherein the radially extending portion or flange 103a (this portion is affixed to the output element of the engine) of the flywheel 103 has at least one inlet 191 in the form of a bore 191 which serves for admission of a viscous fluid medium (e.g., grease) into the annular chamber 130. Once the required quantity of fluid medium is admitted, the inlet 191 is sealed by a plug 192 which can be forcibly (sealingly) inserted into the inlet. In addition to or in lieu of such forcible introduction into the inlet 191, the peripheral surface of the shank of the plug 192 can be provided with a circumferential groove 193 for a sealing ring 194, e.g., an O-ring.

The section 132 of the housing which defines the chamber 130 is a stamping of sheet metal having a radially outermost portion which is secured to the radially outermost portion of the section 131 of the flywheel 103 by a set of axially parallel rivets 138. That radially extending surface of the section 131 which faces the section 132 has a circumferentially complete groove for a sealing ring 136 which is deformed in response to the application of rivets 138 so as to seal the radially outermost portion of the chamber 130 from the atmosphere. Sealing of the radially outermost portion of the chamber 130 is important because the confined fluid medium tends to escape radially outwardly when the apparatus 101 is rotated at an elevated speed. The sealing ring 136 is located radially inwardly of the annulus of rivets 138.

A sealing member 175 in the form of a diaphragm spring is installed between the radially innermost portion of the section 132 and the adjacent portion of the flywheel 104. The sealing member 175 is installed in prestressed condition so as to seal the respective portion of the chamber 130 from the atmosphere.

FIG. 3 further shows the antifriction bearing 116 between the flywheels 103, 104 and a resilient element 129 which corresponds to the resilient element 29 of FIG. 1a.

The feature that the flywheel 3 or 103 is rotated at an elevated speed (between 4000 and 7000 RPM) prior to balancing of such flywheel (the balancing can take place independently of the other flywheel or flywheels of the composite flywheel or upon completed assembly of the entire apparatus 1 or 101) brings about a number of important advantages. Thus, the fluid medium in the chamber 30 or 130 is properly distributed so that it forms a ring with an inner surface located at a constant distance from the axis of the flywheel 3 or 103. This ensures the expulsion of air which is entrapped in the chamber 30 or 130 at the time of admission of fluid medium. Consequently, the balancing of flywheel 3 or 103, which follows such rotating step, is much more reliable because no pockets of entrapped air are present in the ring-shaped supply of viscous fluid medium in the radially outermost portion of the chamber 30 or 130. The aforementioned range of rotational speeds between 4000 and 7000 RPM suffices even if the viscosity of the medium in the chamber is very high and even if the nature of the medium is such that its viscosity does not change at all, or changes only negligibly, in response to heating to a maximum temperature which is anticipated during actual use of the apparatus. This ensures that the flywheel 3 or 103 can be balanced with a very high degree of precision which, in turn, contributes to longer useful life and more satisfactory operation of the assembled apparatus.

The admission of fluid medium into the chamber 30 or 130 can take place prior to start of the rotating step or in the course of such rotating step (prior to actual balancing of the flywheel 3 or 103). Admission of fluid medium while the flywheel 3 or 103 rotates at 4000–7000 RPM is preferred at this time. However, it is equally within the purview of the invention to admit (e.g., inject of press) the fluid medium into the chamber (e.g., by way of the inlet 191 shown in FIG. 3) while the flywheel 3 or 103 is driven at less than 4000 RPM. It has been found that the distribution of fluid medium in the chamber 30 or 130 is highly satisfactory if the RPM of the flywheel 3 or 103 during distribution of fluid medium therein is between two and fifteen times the RPM during balancing of the flywheel 3 or 103. As mentioned above, balancing can include rotation of the flywheel 3 or 103 at 400–2000 RPM. The RPM of the flywheel 3 or 103 during distribution of viscous fluid medium therein preferably at least equals but can greatly exceed the rotational speed of the output element of the engine which is used in conjunction with the apparatus 1 or 101.

Rotation of the flywheel 3 or 103 at 4000–7000 RPM during distribution of the fluid medium in the chamber 30 or 130 invariably ensures that no air is entrapped in the ring of fluid medium which accumulates in the radially outermost portion of the chamber when the distributing step is completed. This practically eliminates the possibility that the flywheel 3 or 103 would run out of true upon completion of the assembling step due to penetration of fluid medium into unfilled pockets of entrapped air. An interval of 30 to 180 seconds (normally approximately 60 seconds) has been found to suffice for reliable and highly satisfactory distribution of fluid medium in the chamber 30 or 130, even if the viscosity of the fluid medium in the chamber during rotation at 4000–7000 RPM is very high. The length of the interval depends on several parameters, such as the viscosity of the fluid medium and the selected RPM. The interval of rotation of the flywheel 3 or 103 at 4000 RPM or more can be reduced by heating the flywheel 3 or 103 and/or by preheating the fluid medium prior to admission into the chamber 30 or 130. If desired, the flywheel 3 or 103 can be heated prior to admission of fluid medium into the chamber 30 or 130 and the fluid medium can also be heated prior to admission into the chamber. As a rule, the flywheel 3 or 103 and/or the supply of fluid medium will be heated to a temperature of 80°–250° C., depending upon the viscosity of the fluid medium and the desired reduction of the length of interval of distribution of fluid medium in the chamber.

The provision of one or more sealable inlets 191 which allow for introduction of fluid medium into the chamber 130 is desirable or advantageous if the fluid medium is to be introduced upon completed assembly of the entire apparatus 101. The inlet of inlets can be omitted (to thus reduce the problems in connection with proper sealing of the chamber) if the fluid medium is admitted prior to coupling of the flywheel 4 or 104 to the associated flywheel 3 or 103. As mentioned above, the admission of fluid medium then takes place by way of the still open portion of the chamber 30, such as in the region between the protuberance 20 and the radially innermost portion (layer 75b) of the sealing member 75 shown in FIGS. 1 and 1a. It is further possible to admit some of the required or selected quantity of fluid medium prior to the distributing step and to admit additional fluid medium upon completion of rotation at an RPM in excess of 4000.

In accordance with a presently preferred embodiment of the method, the flywheels 3 and 4 or 103, 104 are balanced independently of each other, and such balancing steps are followed by a coupling of the flywheels to each other. The coupling operation can but need not be followed by a balancing of the entire apparatus 1 or 101.

Apparatus for balancing flywheels are well known and need not be described here. Such apparatus comprise motor means for rotating a flywheel which is to be balanced, and the motor means can be readily designed to rotate the flywheel 3, 4, 103, 104 or the fully assembled apparatus 1 or 101 at a speed of up to and, if necessary, in excess of 7000 RPM as well as at a much lower speed (such as 400–2000 RPM) which is desirable in the course of the balancing operation.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of making torsional vibration damping apparatus wherein a composite flywheel has a first flywheel connectable with the engine of a motor vehicle and a second flywheel connectable with a transmission, wherein at least one of the first and second flywheels has an annular chamber for a supply of fluid medium being of pasty consistency having a high viscosity and wherein the first and second flywheels are movable angularly with reference to each other, comprising the steps of balancing at least the one flywheel; and rotating the one flywheel and the supply of fluid medium therein prior to the balancing step at a speed such that the fluid medium is uniformly distributed in the chamber to a level at a constant distance from the axis of rotation of the one flywheel.

2. The method of claim 1, wherein said balancing step includes balancing only the one flywheel.

3. The method of claim 1, further comprising the step of coupling the first and second flywheels to each other prior to said balancing step.

4. The method of claim 1, further comprising the step of admitting at least a portion of the supply of fluid medium into the chamber prior to said rotating step.

5. The method of claim 1, further comprising the step of admitting at least a portion of the supply of fluid medium into the chamber in the course of said rotating step.

6. The method of claim 1, wherein said balancing step includes driving the one flywheel at a first rotational speed and said rotating step includes driving the one flywheel at a second rotational speed between two and fifteen times said first speed.

7. The method of claim 1, wherein said rotating step includes driving the one flywheel at 4000–7000 RPM.

8. The method of claim 7, wherein said rotating step includes driving the one flywheel at 5000–6000 RPM.

9. The method of claim 1, wherein said rotating step includes driving the one flywheel at said speed for an interval of 30–180 seconds.

10. The method of claim 9, wherein said interval is approximately 60 seconds.

11. The method of claim 1, further comprising the step of heating the one flywheel not later than in the course of said rotating step so as to promote the distribution of fluid medium in the chamber.

12. The method of claim 1, further comprising the steps of heating the fluid medium and introducing the heated fluid medium into the chamber not later than in the course of said rotating step.

13. The method of claim 12, wherein said heating step includes heating the fluid medium to a temperature of 80°–250° C.

14. The method of claim 1, further comprising the step of heating the one flywheel to a temperature of 80°–250° C. and introducing the heated fluid medium into the chamber not later than in the course of said rotating step.

15. The method of claim 1, further comprising the steps of providing the one flywheel with at least one inlet for admission of fluid medium into the chamber, admitting the fluid medium into the chamber by way of the inlet not later than in the course of said rotating step, and sealing the inlet.

16. The method of claim 15, wherein said admitting step includes injecting the fluid medium into the chamber by way of the inlet.

17. The method of claim 15, wherein said admitting step includes pressing the fluid medium into the chamber by way of the inlet.

18. The method of claim 1, further comprising the step of assembling the first and second flywheels and installing the damper means in the chamber prior to said balancing step.

19. The method of claim 1, further comprising the step of coupling the other of the first and second flywheels to the one flywheel upon completion of said rotating step.

20. The method of claim 19, wherein said balancing step follows said coupling step.

21. The method of claim 1, wherein said balancing step includes driving the one flywheel at 400–2000 RPM.

22. The method of claim 1, further comprising the steps of balancing the other of the first and second flywheels, and coupling the first and second flywheels to each other upon completion of both balancing steps.

23. The method of claim 1, wherein the fluid medium has a pasty consistency.

24. The method of claim 23, wherein the fluid medium is a grease.

25. The method of claim 23, wherein the fluid medium is a lubricant.

* * * * *